(12) United States Patent
Stein

(10) Patent No.: US 7,650,835 B2
(45) Date of Patent: Jan. 26, 2010

(54) PRODUCE RIPENING SYSTEM

(76) Inventor: Russ Stein, 10 Karens La., Englewood Cliffs, NJ (US) 07632

( * ) Notice: Subject to any disclaimer, the term of this patent is extended or adjusted under 35 U.S.C. 154(b) by 1009 days.

(21) Appl. No.: 10/905,082

(22) Filed: Dec. 14, 2004

(65) Prior Publication Data

US 2005/0165499 A1 Jul. 28, 2005

Related U.S. Application Data

(60) Provisional application No. 60/521,473, filed on May 2, 2004, provisional application No. 60/481,954, filed on Jan. 26, 2004.

(51) Int. Cl.
*A23L 1/00* (2006.01)
(52) U.S. Cl. .......................... 99/468; 99/467
(58) Field of Classification Search ........... 99/467–479, 99/485–489; 700/383; 235/383, 375; 62/209, 62/157, 229–231; 236/46 A
See application file for complete search history.

(56) References Cited

U.S. PATENT DOCUMENTS

| | | |
|---|---|---|
| 3,333,967 A | 8/1967 | Burg |
| 3,620,765 A * | 11/1971 | McDonnell et al. ......... 426/263 |
| 4,764,389 A | 8/1988 | LaBarge |
| 4,779,524 A | 10/1988 | Wade |
| 4,886,372 A | 12/1989 | Greengrass et al. |
| 4,891,756 A | 1/1990 | Williams, III |
| 5,028,443 A | 7/1991 | Wade |
| 5,249,428 A | 10/1993 | Barbe et al. |
| 5,316,178 A | 5/1994 | Garber, Jr. |
| 5,375,929 A | 12/1994 | Bergmoser |
| 5,478,989 A | 12/1995 | Shepley |
| 5,492,705 A | 2/1996 | Porchia et al. |
| 5,546,475 A | 8/1996 | Bolle et al. |
| 5,640,193 A | 6/1997 | Wellner |
| 5,771,790 A | 6/1998 | Barrows |
| 5,799,495 A | 9/1998 | Gast, Jr. et al. |
| 5,829,602 A | 11/1998 | St. John Danko |

(Continued)

FOREIGN PATENT DOCUMENTS

EP 0162674 11/1985

(Continued)

OTHER PUBLICATIONS

Wisconsin Innovation Service Center, New Product Feasibility Assessment: Produce Ripening Enhancement, Jul. 2004, Published in: Whitewater, WI, USA.

(Continued)

*Primary Examiner*—Timothy F. Simone
(74) *Attorney, Agent, or Firm*—Oppedahl Patent Law Firm LLC

(57) ABSTRACT

A fruit ripening system wherein a continuous inflow of fresh air and ethylene gas is provided into a fruit ripening chamber in correct proportions to form a fruit ripening gas mixture that will predictably ripen fruit in a very short period of time, regardless of the previous state of ripening of the fruit. At the same time, the ripening chamber is continuously purged of carbon dioxide that is a byproduct of the ripening process so that during the ripening process a concentration of carbon dioxide sufficient to materially impede the ripening process is never allowed to build up. Critical parameters are defined for ripening temperature, the minimum ethylene gas concentration, time of exposure to the ethylene gas, and purging of carbon dioxide.

2 Claims, 2 Drawing Sheets

U.S. PATENT DOCUMENTS

| | | | |
|---|---|---|---|
| 5,832,446 | A | 11/1998 | Neuhaus |
| 5,841,115 | A | 11/1998 | Shepley |
| 5,859,414 | A * | 1/1999 | Grimes et al. ............... 235/383 |
| 5,899,084 | A * | 5/1999 | Franaszek et al. ............. 62/209 |
| 5,949,411 | A | 9/1999 | Doerr et al. |
| 5,950,173 | A | 9/1999 | Perkowski |
| 5,979,757 | A | 11/1999 | Tracy et al. |
| 5,983,200 | A | 11/1999 | Slotznick |
| 6,024,281 | A | 2/2000 | Shepley |
| 6,363,366 | B1 | 3/2002 | Henty |
| 6,375,077 | B1 | 4/2002 | Hankins |
| 6,530,521 | B1 | 3/2003 | Henry |
| 2002/0045016 | A1 * | 4/2002 | Rohrer et al. .............. 428/34.4 |
| 2002/0122743 | A1 * | 9/2002 | Huang ......................... 422/24 |

OTHER PUBLICATIONS

Wisconsin Innovation Service Center, New Product Feasibility Assessment: Produce Ripening System, Jul. 2004, Published in: Whitewater, WI, USA.

* cited by examiner

PRODUCE RIPENING SYSTEM

CROSS REFERENCE TO RELATED APPLICATIONS

This application claims the benefit of US provisional application 60/481,954 filed on Jan. 26, 2004 and US provisional application 60/521,473 filed on May 2, 2004, both of which are incorporated herein by reference.

BACKGROUND

The invention relates generally to produce storage and ripening and relates particularly to ways of storing and ripening produce upon demand.

In a simpler world, produce such as fruit and vegetables, especially perishable fruit and vegetables, were not transported very far to the place of consumption. Because the transportation distance was not great, the time in transit was not great. Would-be consumers who lived a distance from the farm or orchard would not be able to obtain a wide selection of fruits and vegetables. The only fruit and vegetables available at all would be those that are "in season" at farms or orchards that were not too far away.

It has become commonplace, in recent years, to transport nearly all kinds of fruit and vegetables great distances to consumers. From the consumer's point of view, this has led to an extremely wide selection of fruits and vegetables, and the breadth of the selection is maintained throughout the year.

Part of what makes this selection possible is that many fruits and vegetables are picked when they are not yet ripe. This permits shipping the produce with the intention that the produce will ripen at a later time. In many cases it is assumed that some of the ripening can happen in transit, and that some of the ripening may happen while the produce is in the store awaiting purchase. Finally some of the ripening may happen in the home of the consumer.

It is well known to supply ethylene gas to produce during transit to help the produce ripen. It is also known to purge the ambient air about the produce to flush away carbon dioxide which is emitted by produce during ripening and which interferes with ripening.

US Patents directed generally to controlled ripening of produce include "Method for storing fruit," U.S. Pat. No. 3,333,967 issued in October 1967; "Fruit ripening ethylene gas storage and dispensing system and container therefore," U.S. Pat. No. 5,316,178, issued in May 1994; "Method for controlling the ripening of fresh produce," U.S. Pat. No. 5,028,443, issued in July 1991; "Apparatus for controlling the ripening of fresh produce," U.S. Pat. No. 4,779,524, issued in October 1988; and "Method for accelerating fruit respiration," U.S. Pat. No. 4,764,389, issued in August 1988. The latter shows, et alia, a ripening enclosure intended for use in the home of the consumer.

Ripening in the home is not easy to get right. Many consumers are not aware of how to ripen produce correctly. Those consumers who are aware how to ripen produce correctly may nonetheless not have needed equipment and facilities to ripen the produce correctly. Finally, some prior-art apparatus that is meant to assist a consumer in ripening produce does not work well for its purpose.

One way to ripen produce is simply to store it until it has ripened. This has drawbacks. For example the produce may ripen on a day that is earlier or later than the day the consumer wished to make use of the produce. The consumer who wishes to guard against this problem will be forced to purchase produce on several different days, gambling that one or another days' worth of produce may happen to ripen on the desired day. This requires storage space for the batches of produce, and risks wasting some of the produce.

SUMMARY OF THE INVENTION

The invention relates generally to produce storage and ripening and relates particularly to ways of storing and ripening produce upon demand.

A fruit ripening system is described wherein a continuous inflow of fresh air and ethylene gas is provided into a fruit ripening chamber in correct proportions to form a fruit ripening gas mixture that will predictably ripen fruit in a very short period of time, regardless of the previous state of ripening of the fruit. At the same time, the ripening chamber is continuously purged of carbon dioxide that is a byproduct of the ripening process so that during the ripening process a concentration of carbon dioxide sufficient to materially impede the ripening process is never allowed to build up. Critical parameters are defined for ripening temperature, the minimum ethylene gas concentration, time of exposure to the ethylene gas, and purging of carbon dioxide.

DETAILED DESCRIPTION OF THE INVENTION

Figure 1:
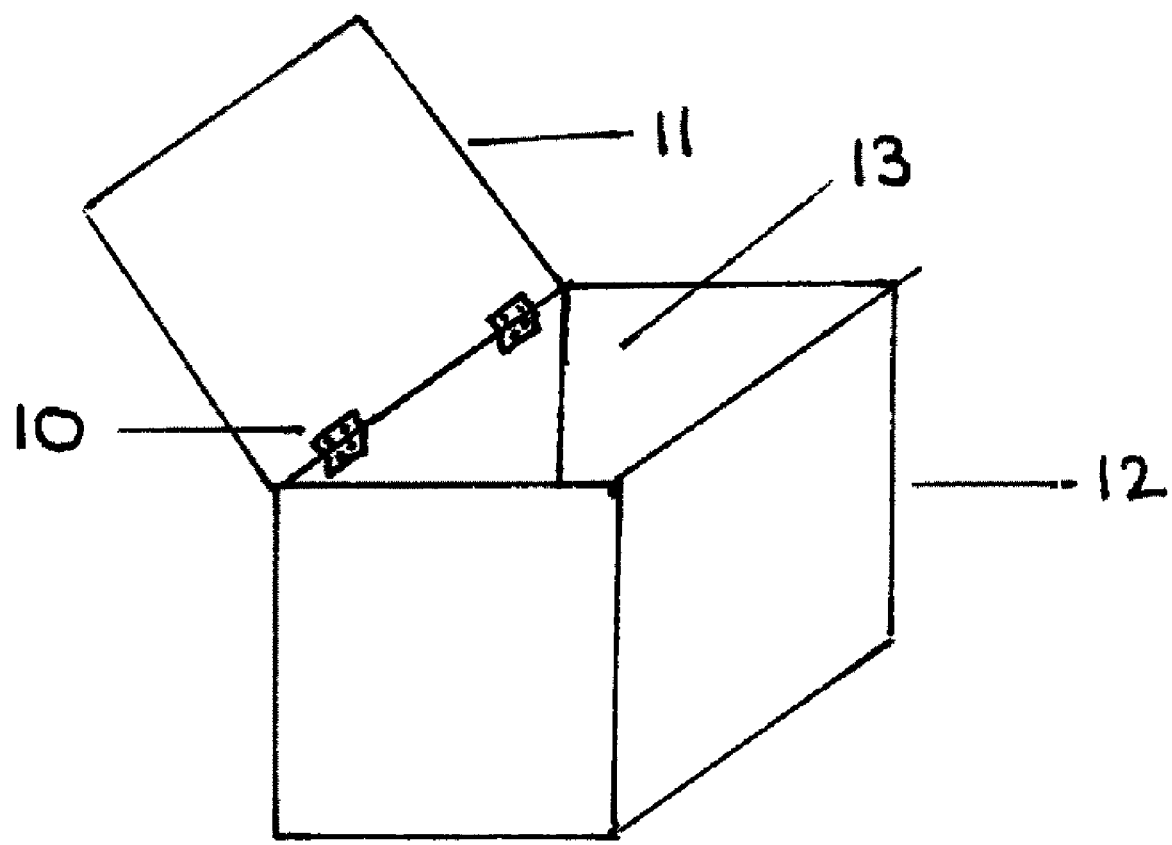
FIG. 1 is a perspective view of a unit according to the invention.

FIG. 1 is a perspective view of a unit 12 according to the invention. Lid 11 may be seen, in this view partially opened. Lid 11 rotates about hinge 10, permitting access to chamber 13.

Figure 2:
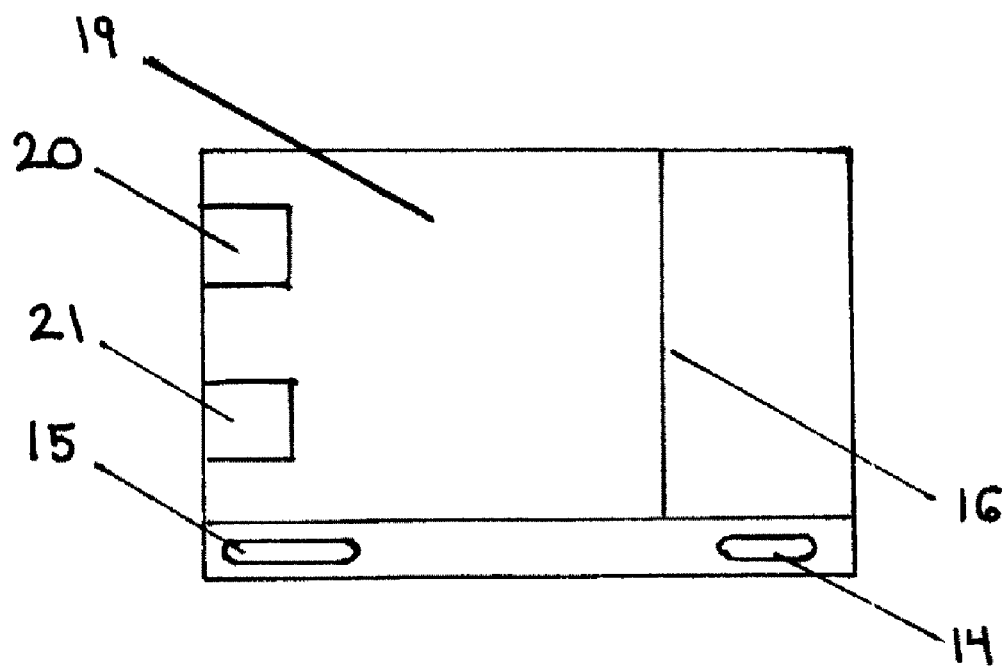
FIG. 2 is a cross section of the unit of FIG. 1.

FIG. 2 is a cross section of the unit 12 of FIG. 1. Movable partition 16 may be seen in edge-on view. It can move laterally (to the left and right in FIG. 2) to make the active portion (i.e. food ripening area) 19 of the chamber 13 larger or smaller, as will be discussed in greater detail below. Ethylene emitter 15 is able to emit ethylene into the active portion 19 of the chamber 13. Blower 14 permits influx of fresh air into the area of the emitter 15. The air, after mixing with the ethylene at the emitter 15, flows into the active portion 19.

Figure 3:
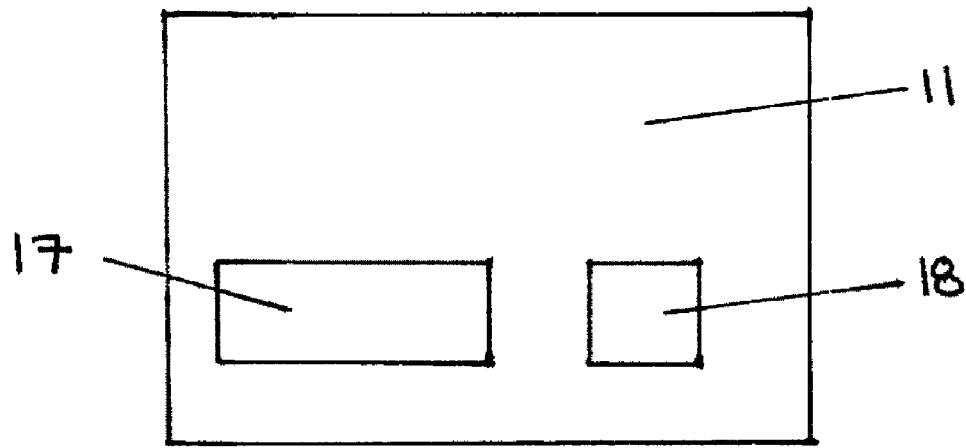
FIG. 3 is a top view of the unit of FIG. 1, with the lid shut.

FIG. 3, is a top view of the unit 12 of FIG. 1, with the lid 11 shut. Lid 11 is visible in plan view. Display 17 may be seen along with keypad 18. The display 17 and the 2 keypad 18 are communicatively connected with control electronics omitted for clarity in FIG. 3. The control electronics also control the ethylene emitter 15, the blower 14, the lighting control unit 20, and the temperature control unit 21.

Lighting control unit 20 permits controlling the light impinging upon the produce-visible light, radiant heat, infrared, and ultraviolet. Temperature control unit 21 permits keeping the produce warmer or cooler so as to accelerate or slow down the ripening, or to preserve the produce in its ripe state after it has ripened.

A goal of the apparatus is to enrich people's lives by making fresh ripe food (especially fruit and vegetables) more readily available for home and commercial use by either accelerating or retarding ripening.

The invention essentially combines other inventions to allow them to work in concert to create a home or commercial ripening system combining ripening agents, chamber, and a database with a control device.

The apparatus will now be described in some greater detail. The apparatus may contain any or all of the following features.

Chamber. A chamber 19 for the food item (such as fruits and vegetables); this chamber may be adjustable to the size of the fruit (one size for pineapple a different size for a plum) by moving partition 16.

Catalyst. A catalyst agent (for either ripening or retarding ripening), for example a detachable canister of ethylene gas, providing emitter 15.

Gas regulation. A mechanism for regulating the gases around the food item, (which may be a fan or vent, or water spray etc). See for example blower 14.

Lighting regulation. A mechanism 20 for controlling light in the chamber (including all spectrums; radiant heat, infrared, ultraviolet etc).

Controls. A device which controls some or all of the systems above, such as a microcontroller.

Input devices. A system for linking ripening information to the device above (a dial or multiple dials or keypad 18 which may control different settings for an apple vs. a plum or a device such as a computer with a database that controls the device or settings that differentiate between food items or suggest to the operator how to better control the operation of the device to best ripen fruit).

Display. A visual, or aural or tactile or other display 17 which displays ripening or retarding information.

Temperature control. A temperature control 21 designed to optimize or retard ripening in combination of the above.

In a typical method, the consumer reads a PLU (price lookup) number from the produce, and enters that number into the keypad 18. Alternatively a UPC bar code may be used, or an alphabetic entry of the name of the fruit or vegetable. This permits the microcontroller to recommend a course of action for ripening that particular fruit or vegetable.

What is claimed is:

1. An apparatus for ripening an identified food comprising:
   (i) a chamber, wherein the chamber comprises a movable partition disposed within the chamber, a chamber wall, and a lid disposed about the chamber, wherein the lid, the movable partition, and the chamber wall define a volume of a food ripening space, wherein an end user may access the food ripening space when the lid is in an open position to insert and remove a food identified with an identifier, wherein the identifier of the identified food is selected from the group consisting of UPC bar codes, SKU numbers, and PLU numbers, and wherein the lid maintains a surface between the food ripening space and the atmosphere outside the food ripening space when the lid is in a closed position;
   (ii) an ethylene ripening system, wherein the ethylene ripening system comprises means for storing ethylene gas and an ethylene gas emitter connected to the means for storing ethylene gas, wherein the ethylene gas emitter is disposed within the food ripening space and is adapted to emit and emits the ethylene gas into the food ripening space;
   (iii) a means for providing light to the food ripening space;
   (iv) a means for maintaining the temperature at one or more desired levels within the food ripening space;
   (v) a user interface adapted to receive input and receives input indicative of the identifier of the food identified with the identifier, wherein the user interface is adapted to generate and which generates a first signal indicative of the identifier of the identified food;
   (vi) a computer adapted to receive and receives the first signal or a signal representative of the first signal, and wherein the computer comprises:
      (a) a database comprising data, wherein the data comprises ripening directions of the identified food corresponding to the identifier of the identified food, wherein the ripening directions comprise ethylene gas concentration and exposure information, ripening temperature information, and light exposure information, and
      (b) means for referencing the first signal with the database to provide the data comprising ripening directions of the identified food corresponding to the identifier of the identified food, wherein the computer provides a second signal indicative of the data comprising ripening directions of the identified food corresponding to the identifier of the identified food;
   (vii) a control system adapted to receive and receives the second signal or signal representative of the second signal, wherein the control system is adapted to control and controls:
      (a) the ethylene ripening system, wherein the control system controls the amount of ethylene gas added to the food ripening space and the concentration of ethylene gas contained within the food ripening space, and
      (b) the means for providing light to the food ripening space, wherein the controller controls the amount and intensity of light introduced to the food ripening space, and
      (c) the means for maintaining the temperature at a desired level within the food ripening space, wherein the control system controls the temperature within the food ripening space at one or more set points, wherein the control of (a), (b), and (c) are carried out in accordance with the ripening directions of the second signal, and wherein the control system is adapted to generate and generates a third signal indicative of the concentration of ethylene gas within the food ripening space, the temperature within the food ripening space, and the amount and intensity of light introduced to the food ripening space; and
   (viii) a display means adapted to receive and receives the second signal or a signal representative of the second signal, and the third signal or signal representative of the third signal, wherein the display means is adapted to display and displays the data contained within the second signal or signal representative of the second signal comprising ripening directions of the identified food corresponding to the identifier of the identified food, and wherein the display means is capable of displaying the data contained within the third signal or signal representative of the third signal indicative of the concentration of ethylene gas within the food ripening space, the temperature within the chamber, and the amount and intensity of light introduced to the food ripening space, wherein the apparatus for ripening the identified food has a predetermined size, wherein the predetermined size is selected such that the apparatus may be used in the home of the end user;
   wherein the means for providing light to the food ripening space is accomplished by the use of a light bulb disposed within the food ripening space; and
   wherein the light bulb is an ultraviolet light bulb.

2. An apparatus for ripening food comprising:
   (i) a chamber, wherein the chamber comprises a movable partition disposed within the chamber, a chamber wall, and a lid disposed about the chamber, wherein the lid, the movable partition, and the chamber wall define a volume of a food ripening space wherein an end user may access so as to define the volume of the food ripening space, wherein an end user may access the food ripening space when the lid is in an open position to insert and remove a food, and wherein the lid maintains a surface between the food ripening space and the atmosphere outside the food ripening space when the lid is in a closed position;

(ii) an ethylene ripening system, wherein the ethylene ripening system comprises means for storing ethylene gas and an ethylene gas emitter connected to the means for storing ethylene gas, wherein the ethylene gas emitter is disposed within the food ripening space and is adapted to emit and which emits the ethylene gas into the food ripening space;

(iii) a means for providing light to the food ripening space;

(iv) a means for maintaining the temperature at a desired level within the food ripening space;

(v) a user interface adapted to receive input from an end user and which receives input from an end user indicative of the ripening directions of the food, wherein the ripening directions comprise ethylene gas concentration and exposure information, ripening temperature information, and light exposure information, and wherein the user interface is adapted to generate and which generates a first signal indicative of the ripening directions of food;

(vi) a control system adapted to receive and which receives the first signal or signal representative of the first signal, wherein the control system is capable of controlling and which controls:
  (a) the ethylene ripening system, wherein the control system controls the amount of ethylene gas added to the food ripening space and the concentration of ethylene gas contained within the food ripening space,
  (b) the means for maintaining the temperature at a desired level within the food ripening space, wherein the control system controls the temperature at one or more set points throughout the ripening process, and
  (c) the means for providing light to the food ripening space, wherein the control system controls the amount and intensity of light introduced to the food ripening space, wherein the control of (a), (b), and (c) are carried out in accordance with the ripening directions of the first signal; and (vii) a display means capable of receiving the first signal or a signal representative of the first signal, wherein the display means is capable of displaying the data comprising ripening directions of the food in the form of written communication or electronic communication, wherein the apparatus for ripening the food has a predetermined size, wherein the predetermined size is selected such that the apparatus may be used in the home of the end user.

* * * * *

UNITED STATES PATENT AND TRADEMARK OFFICE
CERTIFICATE OF CORRECTION

PATENT NO. : 7,650,835 B2
APPLICATION NO. : 10/905082
DATED : January 26, 2010
INVENTOR(S) : Russ Stein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1415 days.

Signed and Sealed this

Twenty-third Day of November, 2010

David J. Kappos
*Director of the United States Patent and Trademark Office*